United States Patent Office 3,577,531
Patented May 4, 1971

3,577,531
DIANEMYCIN FOR TREATING COCCIDIOSIS
Marvin Gorman and Robert L. Hamill, Indianapolis, Ind., assignors to Eli Lilly and Company, Indianapolis, Ind.
No Drawing. Filed Sept. 11, 1968, Ser. No. 759,198
Int. Cl. A61k 21/00
U.S. Cl. 424—122          1 Claim

ABSTRACT OF THE DISCLOSURE

Methods and compositions for controlling coccidiosis employing the antibiotic dianemycin and its alkali metal, alkaline earth, and basic nitrogen salts as the active anticoccidiosis agent.

BACKGROUND OF THE INVENTION

This invention relates generally to the prevention and treatment of coccidiosis and more particularly relates to the use of dianemycin as a coccidiostat, and to novel compositions containing dianemycin or its alkali metal, alkaline earth and basic nitrogen salts as the sole active agent or in combination with other coccidiostats.

Coccidiosis is a common and widespread poultry disease caused by one or more of several species of protozoan parasites of the genus Eimeria such as *E. tenella, E. necatrix, E. acervulina, E. maxima, E. brunetti, E. mivati, E. adenoides,* and *E. maleagrimitis. E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing intestinal coccidiosis. *E. maleagrimitis* and *E. adenoides* are causative organisms of coccidiosis in turkeys.

When left untreated, the severe infections of coccidiosis lead to poor weight gain, reduced feed efficiency, and high mortality in fowl. The morbidity and mortality occasioned by coccidiosis infections create extensive economic loss when such infections are left untreated or unchecked. The elimination or control of this disease is, therefore, of paramount importance to the poultry raising industry.

SUMMARY OF THE INVENTION

Dianemycin has previously been reported as an antibiotic useful in metabolic studies by Lardy et al., 1958, "Antibiotics as Tools for Metabolic Studies—I. A survey of Toxic Antibiotics in Respiratory, Phosphorylative, and Glycolytic Systems." Arch. Biochem. Biophysics 78: 587–597.

Dianemycin is an acidic molecule produced by cultivating under controlled conditions a strain of Streptomyces spp. NRRL 3444. The antibiotic is purified as a crystalline solid from ethanol-water, melting at 72–74° C. Dianemycin is soluble in esters, benzene, halogenated hydrocarbons, dimethylformamide, dimethylsulfoxide, and ethers, is slightly soluble in alcohols and ketones, and is very slightly soluble in water. Dianemycin has an acidic pK'a of 6.6 (in 66 percent dimethylformamide), and a characteristic ultraviolet absorption maximum at 232 m$\mu$ ($A_m$=15,000).

The precise molecular weight of dianemycin has not yet been determined. Titration studies indicate a molecular weight of about 958. The molecular weight based on X-ray studies is about 950. Elemental analysis of crystalline dianemycin dried in vacuo at about 89° C. over phosphorous pentoxide gave the following values:

| Element: | Percent |
|---|---|
| Carbon | 63.68 |
| Hydrogen | 9.47 |
| Oxygen | 27.35 |

Nuclear magnetic resonance studies indicate the presence of one (1) methoxy group, one

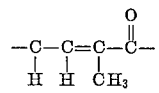

group, one

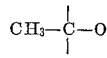

group, and a number of

groups.

Dianemycin is advantageously recovered from the fermentation broth and mycelial cake as follows: Twenty-five liters of broth were filtered with 3 percent Hyflo super-cel. The mycelial cake was extracted with 8 liters of methanol. The methanolic extract was concentrated in vacuo to remove the methanol. The filtrate and extract were combined, adjusted to pH 3 with 6 N hydrochloric acid, and extracted with 20 liters of chloroform. The chloroform extract was concentrated to a low volume, and passed over a column of activated carbon to remove color. The effluent was concentrated to an oil in vacuo. The oil was dissolved in acetone, and water was added until the solution became cloudy. The acetone was then allowed to evaporate until crystallization occurred. The crystals were filtered off and dried in vacuo to yield 3.45 g. of dianemycin, M.P., 72–74° C., $[\alpha]_D^{25}=+39.93$ (C=2, methanol), having a biological activity of 1100 units/mg.

The sodium salt of dianemycin can be prepared as follows: 830 mg. of dianemycin was dissolved in 8.3 ml. of acetone. To the solution were added 1.5 ml. of 1 N sodium hydroxide, and water was then added until the solution became turbid. The mixture was allowed to stand at 5° C. until crystallization occurred. The crystals were filtered and dried in vacuo to yield 550 mg. of the sodium salt of dianemycin, M.P., 210–212° C., $[\alpha]_D^{25}=+37.08$ (C=1, methanol), having a biological activity of 1150 units/mg.

The activity of dianemycin and the sodium salt of dianemycin was assayed against *Bacillus subtilis* ATCC 6633 using a conventional paper disc agar diffusion plate assay.

The novel organism capable of producing dianemycin has been placed on permanent deposit, without restriction, with the Northern Utilization Research and Development Division, Agricultural Research Services, U.S. Dept. of Agriculture (formerly Northern Regional Research Laboratories) at Peoria, Ill. It is available to the public under the NRRL No. 3444.

We have now found that dianemycin and its alkali metal, alkaline earth and basic nitrogen salts are active against protozoa which cause coccidiosis and hence are useful as coccidiostats when small amounts of the compounds are administered to poultry.

It is to be understood that the term "basic nitrogen salts" includes but is not limited to the following: ammonium, methylamine, dimethylamine, trimethylamine, ethylamine, diethylamine, and like salts.

It is a primary object of this invention to provide a new method for preventing and controlling coccidiosis infections in poultry. It is a further object to provide novel compositions which, when added to animal feedstuffs, are effective in preventing clinical coccidiosis. A still further object is to provide animal feedstuffs containing dianemycin or its salts alone or in combination with other coccidiostats. Other objects will be come apparent from the ensuing discussion of the invention.

DESCRIPTION OF PREFERRED EMBODIMENTS

In accordance with the present invention, we have discovered that dianemycin, its alkali metal, alkaline earth, and basic nitrogen salts are potent coccidiostats, which, when administered to poultry, arrest the development of coccidiosis and are also useful as prophylactic agents in controlling coccidiosis. Our new coccidiostats are conveniently fed to poultry as a feed component, although they may also be dissolved or suspended in the drinking water. According to a preferred embodiment, novel compositions are provided which comprise dianemycin intimately dispersed in or intimately admixed with an edible, inert, solid carrier or diluent to provide a premix or medicated food supplement. An inert carrier or diluent is one that is nonreactive with respect to dianemycin. The carrier or diluent is preferably one that is or may be an ingredient of animal feed.

The preferred compositions of our invention are feed premixes in which dianemycin is present in relatively large amounts and which are suitable for addition to the poultry feed either directly or after an intermediate dilution or blending step. Examples of carriers or diluents suitable for such compositions are animal feed ingredients such as distillers' dried grains, soybean mill run, alfalfa granules, wheat middlings, exfoliated hydrobiotites, corn meal, citrus meal, fermentation residues, ground oyster shells, Attapulgus clay, wheat shorts, molasses solubles, corn cob meal, edible vegetable substances, toasted dehulled soya flour, soybean feed, soybean mill feed, antibiotic mycelia, soy grits, kaolin, talc, crushed limestone and the like. The preferred diluents are soybean products such as soybean mill run and soybean feed, and alfalfa products such as alfalfa granules.

The compositions can be prepared by intimately dispersing or admixing dianemycin as the pure compound, a salt, the mycelial cake or the dried broth throughout the solid inert carrier by methods such as grinding, stirring, milling or tumbling, although, in some instances, it may be absorbed on the carrier by spraying a solution of dianemycin into a rotating mill containing the diluent. By selecting proper diluents and by altering the ratio of carrier to active ingredient, compositions of any desired concentration can be prepared.

The feed premixes can be formulated so that the total active ingredient is present within the range of 10 percent to 80 percent by weight and the diluent or carrier present is correspondingly within the range of 90 percent to 20 percent by weight of the premix. The preferred ratio is about 40 percent by weight of dianemycin to about 60 percent by weight of the diluent. The premixes may be further diluted with an animal feed supplement or may be added directly to an animal feedstuff in order to provide a suitable medicated feedstuff which can be eaten directly by poultry.

The feed supplement may be further diluted with materials such as corn meal or soybean meal before being incorporated in the animal feed. This dilution serves to facilitate uniform distribution of the coccidiostat in the finished feed. The finished feed is one that contains a source of fat, protein, carbohydrate, minerals, vitamins and other nutritional factors.

In the treatment of coccidiosis infections, relatively low levels of dianemycin in poultry feed are sufficient to afford the poultry good protection against coccidiosis. The compound is administered to chickens in an amount equal to about 0.002 to 0.008 percent by weight of the daily feed intake. Optimum results are obtained when about 0.005 percent or 0.1 lb./ton of dianemycin is incorporated into the poultry feed. The most advantageous dosage level will, of course, vary somewhat with particular circumstances such as the type and severity of the coccidial infection to be treated, the daily feed intake of the birds, and the like.

Prior to administration of the medicated feed to poultry, the premix is uniformly dispersed in the animal feed by suitable mixing or blending procedures.

In the above discussion of our invention, emphasis has been placed on solid compositions wherein the active ingredient is mixed with an edible carrier in a premix, or in the final poultry feedstuff.

An alternative method of treatment is to administer a solution or suspension containing a therapeutically effective amount of dianemycin or one of its salts in the drinking water of the poultry. The quantity of the coccidiostat which can be administered in this fashion is, of course, limited by the solubility of dianemycin in water or by the quantity that can be suspended in the water without undue settling. Emulsifiers or surfactants can be employed in order to increase the amount of dianemycin which can be suspended in the water.

In treating poultry according to the method of our invention, one-day-old chicks are started on the medicated feed containing dianemycin. This procedure applies for both broilers and for replacement stock for layer flocks. Broiler birds are maintained on the medicated feed of this invention throughout their life, and the medicated feed is withdrawn prior to slaughter. Replacement stock for layer flocks are maintained on our medicated feed for a minimum of twelve to fourteen weeks.

Generally, dianemycin or one of its salts is added to a conventional basal ration which can comprise the following ingredients: meat and bone scrap; fish meal; vitamin $B_{12}$; poultry by-product meal; dehulled soybean oil meat; dehydrated alfalfa meal; corn gluten meal; pulverized oats; ground barley; corn meal; wheat middlings; dried grain and whey fermentation solubles; methionine hydroxy analogue calcium; riboflavin; calcium pantothenate; choline chloride; niacin; animal fat; menadione sodium bisulfite; vitamin E supplement; butylated hydroxytoluene; vitamin A palmitate; deactivated animal sterol; calcium carbonate; defluorinated phosphate; NaCl; calcium iodate; manganese oxide; zinc oxide; cobalt hydroxide; and cobalt carbonate.

A medicated feed composition is prepared by adding dianemycin to the basal ration in an amount constituting 0.005 percent by weight of the final mixture. The ingredients are thoroughly admixed to provide the ration which is fed to young chicks.

The following examples will further illustrate the compositions of this invention.

Example 1

Animal feed premixes having the following compositions are prepared by intimately mixing dianemycin and the particular edible solid diluent or diluents:

| Constituents: | Parts by weight |
|---|---|
| (A) | |
| Dianemycin | 50 |
| Alfalfa granules | 50 |
| (B) | |
| Dianemycin | 40 |
| Molasses solubles | 60 |
| (C) | |
| Dianemycin | 30 |
| Corn distillers' dried grains | 70 |
| (D) | |
| Dianemycin, ammonium salt | 40 |
| Corn germ meal | 30 |
| Corn distillers' dried grains | 30 |
| (E) | |
| Dianemycin, sodium salt | 60 |
| Soybean mill feed | 40 |

(F)

| | |
|---|---|
| Dianemycin, calcium salt | 20 |
| Corn distillers' grains | 60 |
| Wheat shorts | 20 |

(G)

| | |
|---|---|
| Dianemycin | 80 |
| Wheat shorts | 20 |

(H)

| | |
|---|---|
| Dianemycin | 25 |
| Soybean feed | 75 |

These premixes are made by mechanical milling or mixing of the ingredients to insure uniform distribution of the active compound.

Example 2

A suitable medicated starter feed for broiler chicks can be prepared by mixing 0.005 percent by weight (0.1 lb./ton of dianemycin) into a typical starter ration having the following composition:

BROILER STARTER

| Ingredients | Percent | Pounds/ton |
|---|---|---|
| Corn, yellow, ground | 58.0 | 1,160 |
| Soybean oil meal, solvent extracted dehulled (50 percent) | 18.0 | 360 |
| Corn gluten meal (60 percent) | 5.0 | 100 |
| Distillers' dried solubles, corn | 5.0 | 100 |
| Fish meal with solubles | 5.0 | 100 |
| Meat scraps (55 percent) | 4.0 | 80 |
| Alfalfa meal, dehydrated (17 percent) | 2.0 | 40 |
| Animal fat, beef tallow | 1.0 | 20 |
| Dicalcium phosphate, feed grade | 0.6 | 12 |
| Calcium carbonate (ground limestone) | 0.5 | 10 |
| Salt (NaCl) | 0.3 | 6 |
| Trace mineral premix AN-01 (1.05) [1] | 0.1 | 2 |
| Vitamin premix CK-01 (1.02) [2] | 0.5 | 10 |
| Total | 100.0 | 2,000 |

[1] Trace mineral premix provides per pound complete feed: manganese, 30.4 mg.; zinc, 34.0 mg.; iron, 7.7 mg.; copper, 0.8 mg.; and iodine, 0.4 mg.
[2] Vitamin premix provides per pound complete food: vitamin A, 2,250 IU; vitamin $D_3$, 600 ICU; vitamin E, 5 IU; menadione sodium bisulfite, 0.5 mg.; riboflavin, 2 mg.; niacin, 18 mg.; pantothenic acid, 4.8 mg.; choline, 130 mg.; and vitamin $B^{12}$, 5 mcg.

After four weeks, the broiler chicks are changed to a suitable medicated feed which is prepared by mixing 0.005 percent by weight of dianemycin into a typical finisher ration having the following composition:

BROILER FINISHER

| Ingredients | Percent | Pounds/ton |
|---|---|---|
| Corn, yellow, ground | 62.8 | 1,256 |
| Soybean oil meal, solvent extracted dehulled (50 percent) | 28.7 | 574 |
| Animal fat, beef tallow | 5.2 | 104 |
| Dicalcium phosphate, feed grade | 1.5 | 30 |
| Calcium carbonate (ground limestone) | 0.75 | 15 |
| Salt (NaCl) | 0.25 | 5 |
| Trace mineral premix AN-01 (1.05) [3] | 0.1 | 2 |
| Vitamin premix CK-01 (1.02) [4] | 0.5 | 10 |
| Methionine hydroxy analogue (90 percent) | 0.2 | 4 |
| Total | 100.0 | 2,000 |

[3] See 1 Supra.
[4] See 2 Supra.

The broilers are maintained on the above medicated diet or one comparable thereto until slaughtered.

Example 3

To control coccidiosis in layer stocks, the chicks are started on a suitable medicated starter feed prepared by mixing about 0.005 percent by weight of dianemycin into a typical starter ration having the following composition:

CHICK STARTER

[0 to 6 weeks]

| Ingredients | Percent | Pounds/Ton |
|---|---|---|
| Corn, yellow, ground | 55.0 | 1,100 |
| Wheat middlings | 10.0 | 200 |
| Soybean oil meal, solvent extracted dehulled (50 percent) | 19.0 | 380 |
| Meat scraps | 5.0 | 100 |
| Distillers' dried solubles, corn | 2.5 | 50 |
| Fish meal with solubles | 2.5 | 50 |
| Alfalfa meal, dehydrated (17 percent) | 2.2 | 44 |
| Whey, whole, dried | 1.5 | 30 |
| Dicalcium phosphate, feed grade | 0.5 | 10 |
| Calcium carbonate (ground limestone) | 0.75 | 15 |
| Salt (NaCl) | 0.25 | 5 |
| Trace mineral premix AN-01 (1.05) [5] | 0.1 | 2 |
| Vitamin premix CK-01 (1.02) [6] | 0.5 | 10 |
| Methionine hydroxy analogue (90 percent) | 0.2 | 4 |
| Total | 100.0 | 2,000 |

[5] See 1 Supra.
[6] See 2 Supra.

After six weeks, the replacement layer chicks are changed to a feed containing 0.005 percent by weight of dianemycin and having the formula:

PULLET GROWER

[6 to 12 weeks]

| Ingredients | Percent | Pounds/ton |
|---|---|---|
| Corn, yellow, ground | 66.0 | 1,320 |
| Soybean oil meal, solvent extracted, dehulled (50 percent) | 12.0 | 240 |
| Wheat middlings | 10.0 | 200 |
| Meat scraps | 5.0 | 100 |
| Alfalfa meal, dehydrated (17 percent) | 2.4 | 48 |
| Fish meal with solubles | 1.5 | 30 |
| Distillers' dried solubles, corn | 1.2 | 24 |
| Dicalcium phosphate, feed grade | 0.4 | 8 |
| Calcium carbonate (ground limestone) | 0.4 | 8 |
| Salt (NaCl) | 0.25 | 5 |
| Trace mineral premix AN-01 (1.05) [7] | 0.1 | 2 |
| Vitamin premix CK-01 (1.02) [8] | 0.5 | 10 |
| Methionine hydroxy analogue (90 percent) | 0.25 | 5 |
| Total | 100.00 | 2,000 |

[7] See 1 Supra.
[8] See 2 Supra.

At twelve weeks and beyond, 0.005 percent by weight of dianemycin is combined in a typical feed having the following formula:

PULLET DEVELOPER

[12 to 22 weeks]

| Ingredients | Percent | Pounds/ton |
|---|---|---|
| Corn, yellow, ground | 66.0 | 1,320 |
| Oats, ground | 15.00 | 300 |
| Soybean oil meal, solvent extracted dehulled (50 percent) | 11.00 | 220 |
| Fish meal with solubles | 2.50 | 50 |
| Alfalfa meal, dehydrated (17 percent) | 2.15 | 43 |
| Dicalcium phosphate, feed grade | 1.50 | 30 |
| Calcium carbonate (ground limestone) | 0.75 | 15 |
| Salt (NaCl) | 0.25 | 5 |
| Trace mineral premix AN-01 (1.05) [9] | 0.10 | 2 |
| Vitamin premix CK-01 (1.02) [10] | 0.50 | 10 |
| Methionine hydroxy analogue (90 percent) | 0.25 | 5 |
| Total | 100.00 | 2,000 |

[9] See 1 Supra.
[10] See 2 Supra.

It will be apparent to those skilled in the art that the coccidiostat of this invention can be incorporated into special feed concentrate and supplement formulations and finished animal feeds containing vitamins, antibiotics, growth-promoting agents, and other nutritional substances.

It will also be apparent to those skilled in the art that the coccidiostats of this invention may be used either alone or in combination with one or more other coccidiostats. That is, poultry can be treated with compositions having dianemycin or one of its salts as the sole coccidiostat or treatment can be initiated wherein dianemycin or one of its salts and one or more other coccidiostats are administered concurrently. For such purposes, dianemycin can be admixed with one or more other coccidiostats including but not limited to the following:

3,4-dinitro-o-toluamide;
3,5-dichloro-2,4-dimethyl-4-pyridinol;
1-(4-amino-2-n-propyl-5-pyrimidinylmethyl)-2-picolinium chloride hydrochloride;
ethyl 4-hydroxy-6,7-diisobutoxy-3-quinolinecarboxylate;
7-benzyloxy-6-n-butyl-3-methoxycarbonylquinol-4-one;
ethyl 4-hydroxy-6-n-decyloxy-7-ethoxyquinoline-3-carboxylate;
2,4-diamino-5-(3,4-dimethoxybenzyl)pyrimidine;
2-chloro-4-nitrobenzamide;
sulfaquinoxaline;
other sulfa compounds;
4,4'-dinitrocarbanilide-2-hydroxy-4,6-dimethylpyrimidine complex;
3,3-dinitrodiphenyldisulfide;
arsanilic acid;
3-amino-4-hydroxyphenylarsonic acid;
5-nitrofurfural semicarbazone, and
the 6,7-dialkoxy-4-hydroxyquinoxaline-3-carboxylic acid esters.

In using combined therapy, therapeutically effective amounts of dianemycin and a second coccidiostat are incorporated into the animal feed.

The following example further illustrates the present invention.

Example 4

Four groups of five nine-day-old chicks were fed a mash diet containing dianemycin, at each of the concentrations listed below, uniformly dispersed in the feed. After having been on this ration for 48 hours, each bird was infected with 200,000 sporulated oocysts of *E. tenella*. Four other groups of five nine-day-old chicks were fed the mash diet free of dianemycin and were not infected with coccidiosis. These served as normal controls. The chickens were maintained on the above diet for seven days. The results of treatment were evaluated seven days after infection. The following results were obtained.

| | Percent in feed (grams/ton) | Percent mortality | Survivor average weight gain, grams |
|---|---|---|---|
| Dianemycin | 0.0044 (40) | 0 | 50 |
| | 0.0022 (20) | 20 | 110 |
| | 0.0011 (10) | 60 | ---------- |
| Infected control | 0.0000 | 95 | ---------- |
| Normal control | 0.0000 | 0 | 148 |

We claim:
1. A method for controlling coccidiosis infections in poultry which comprises feeding said infected poultry with an anticoccidiosis effective amount of dianemycin.

References Cited

The Merck Veterinary Manual, 3rd edition, Merck and Co., Inc., Rahway, N.J., 1967, pp. 1146 and 1147.

Abstracts of papers, 7th Interscience Conference on Antimicrobial Agents and Chemotherapy, Chicago, Ill. Oct. 25–27, 1967, p. 19, No. 41.

JEROME D. GOLDBERG, Primary Examiner